VISCOSITY CHANGE IN VARIOUS FERROCENE-
TEREPHTHALALDEHYDE MELT COPOLYMERIZATIONS

EFFECT OF CATALYST CONCENTRATION ON VISCOSITY
OF FERROCENE-TEREPHTHALALDEHYDE MELT
COPOLYMERIZATIONS AT 140°C

INVENTOR
NORMAN BILOW

BY Harry A. Hubert Jr.
ATTORNEY

United States Patent Office 3,640,961
Patented Feb. 8, 1972

3,640,961
FERROCENE-PHTHALALDEHYDE COPOLYMERS
Norman Bilow, 6118 S. Condon Ave.,
Los Angeles, Calif. 90056
Filed Mar. 6, 1969, Ser. No. 804,870
Int. Cl. C08g 1/10
U.S. Cl. 260—67 R                           1 Claim

ABSTRACT OF THE DISCLOSURE

Thermosetting ferrocene-containing copolymers and process for preparation of same are disclosed. The copolymers are prepared by the reaction of ferrocene or ferrocene derivatives with aromatic dicarboxaldehydes in the presence of a suitable catalyst. The copolymers cure, from low molecular weight soluble resins to insoluble resins of extremely high molecular weight upon treatment with heat and pressure. The products of this invention are useful in the fabrication of composite reinforced plastic structures.

BACKGROUND OF THE INVENTION

(1) Field of the invention

This invention is in the field of thermosetting, ferrocene-containing resins. Soluble, low molecular weight copolymers are prepared. When these low molecular weight structures are applied to reinforcing materials and subjected to heat and pressure they cure to hard, tough, heat-resistant, radiation-resistant resins of high molecular weight.

(2) Description of the prior art

In the prior art, ferrocene copolymers have been made through reactions of ferrocene with phenyldichlorophosphine, ferrocenedicarbonyl chloride, terephthaloyl chloride and the like. These copolymers, however, were not thermosetting nor were they of a sufficiently high molecular weight to make them useful for fabricating composite reinforced structures. They were also not amenable to the preparation of impregnating varnishes because of their extremely low solubility in organic solvents.

Specific prior art of interest in U.S. Pat. No. 3,341,495 to Neuse. Neuse discloses the reaction of ferrocene with monoaldehydes to form polymers of the type:

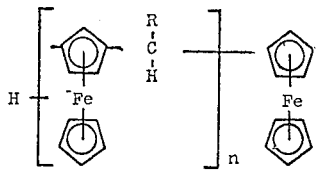

The Neuse polymers have a generally low molecular weight which ranges from a low of about 860 to a high of about 3,350. These polymers, however, are not thermosetting and, therefore, are not useful in the fabrication of reinforced plastic or composite structures.

SUMMARY OF THE INVENTION

The copolymers of this invention are prepared initially in a low molecular weight form. In this form they are soluble in lacquer or varnish type solvents such as methylene chloride, chloroform, trichloroethylene, tetrachloroethane and carbon tetrachloride. The lacquers and varnishes thus prepared may be used to impregnate various reinforcements, such as glass, carbon cloth, quartz or asbestos, or mixed with conventional inert filler and molded or cured to a hard, heat-resistant and insoluble state. After the coating is dried, the resulting reinforced structures may be cut into appropriate shapes or plies and may then be stacked and molded under heat and pressure. Under conditions of heat and pressure, the low molecular weight copolymers of the coat or impregnation thermoset and cure to an infusible resin of high molecular weight. In this cured form, optimum physical properties are obtained.

This invention solves a problem previously existing in the art by making available ferrocene-containing copolymers which are thermosetting and curable to high molecular weights.

DESCRIPTION OF THE PREFERRED EMBODIMENTS

Figure 1:
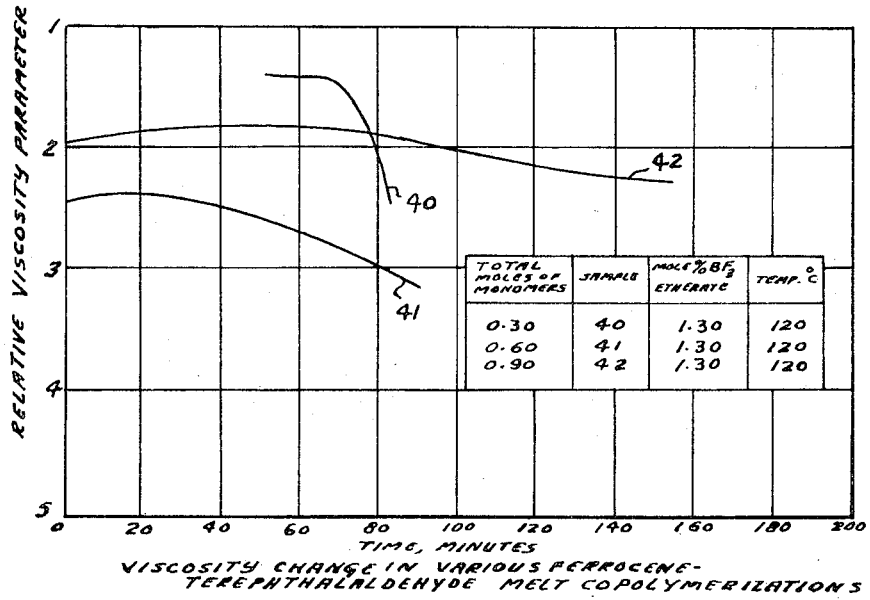
FIG. 1 shows viscosity change in ferrocene-terephthalaldehyde melt copolymerizations when the copolymerizations were carried out at 120° C.

According to the practices of this invention, ferrocene or a derivative of ferrocene is reacted with terephthaldehyde or another suitable aromatic dicarboxaldehyde or mixtures thereof in the presence of a catalyst such as boron trifluoride. Other Lewis acid catalysts such as aluminum trichloride or zinc chloride may be used in lieu of boron trifluoride. Catalysts such as p-toluenesulfonic acid and oxalic acid have also been tried.

Ferrocene derivatives which are useful as reactants are:

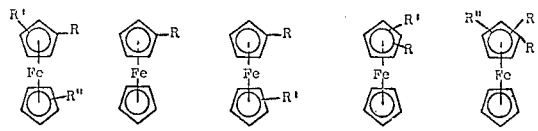

where R, R', and R" are H, $CH_3$, $C_2H_4$, $C_3H_7$, $C_6H_5$, Cl, Br, I, or various other alkyl, aryl or aralkyl moieties which do not introduce excessive steric hinderance, including mixtures of such derivatives.

Dicarboxaldehydes which have been found useful are: terephthaldehyde, 1,1'-ferrocenedicarboxaldehyde, isophthaldehyde, 4,4'-biphenyldicarboxaldehyde, 3,4'-biphenyldicarboxaldehyde, 3,3'-biphenyldicarboxaldehyde, various substituted isophthalaldehydes of the type

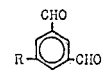

wherein R is alkyl, aryl or halogen, and other dicarboxaldehydes of the type

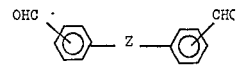

wherein Z is alkylene, oxygen, sulfur, sulfone, phenylene and various other connecting groups. Mixtures of these dicarboxaldehydes and mixtures of dicarboxaldehydes which contain a portion of a polycarboxaldehyde as a tricarboxaldehyde or tetracarboxaldehyde can also be used.

A typical reaction involving ferrocene and terephthalaldehyde proceeds as follows:

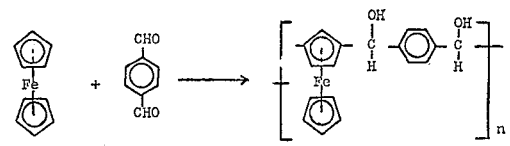

wherein $n$ is an integer of about 2 to 10. After a low molecular weight copolymer of this type is prepared, it can be dissolved in a suitable lacquer or varnish type solvent and applied in the form of a coating or impregnation to various suitable reinforcing materials such as glass cloth, quartz fabric, carbon cloth or asbestos or it can be blended with inert mineral fillers, such as clay or silica, and subsequently dried to provide a filled molding composition. Then, when heat and pressure are applied the hydroxy groups of the above structure react at random with hydroxy groups of other like structure or with carbon atoms of neighboring molecules giving cross-linking with dehydration. Consequently, cross-linked resins of extremely high molecular weight of the cross-linked cured structures because no solvent has been found in which they will dissolve. It is estimated that the final, cured resins of this invention have molecular weights of over fifty thousand. Molecular weights of the soluble, uncured resins were determined by vapor phase osmometry.

Following are some specific examples of some reactions carried out. They are meant to further illustrate the invention but are not to be construed as limiting the invention.

EXAMPLE I

Ferrocene (55.8 g., 0.30 mole) and terephthaldehyde (40.2 g., 0.30 mole) were dissolved in methylene chloride and colorless distilled boron trifluoride etherate was then added. The solution was stirred for 10–20 minutes and the methylene chloride was then removed by vacuum distillation while keeping the temperature below 40° C. The dried reactants were then melted together under argon at 140° C. and the melt was stirred for 45±5 minutes. At this temperature the optimum reaction time varied slightly from run to run and careful observation was necessary in order to stop the reaction before the mixture gelled. The thermosetting prepolymer was dissolved in methylene chloride to form an impregnation lacquer. The resin, and composite structures made therefrom were cured at 400–600° F. and 1000–4000 p.s.i. Fiberglas fabric reinforced laminates made from these resins contained 23–36% cured resin and had flex strengths of 29–33 thousand p.s.i. and moduli of about 3 million p.s.i.

EXAMPLE II

The general procedure of Example I was repeated except that the melt polymerizations were carried out at 120° C. At this temperature the polymerizations were more easily controlled and the end point was not as abrupt. Reactions were relatively easy to stop prior to gelation when ran at this temperature. These reactions are illustrated in FIG. 1.

EXAMPLE III

Figure 2:
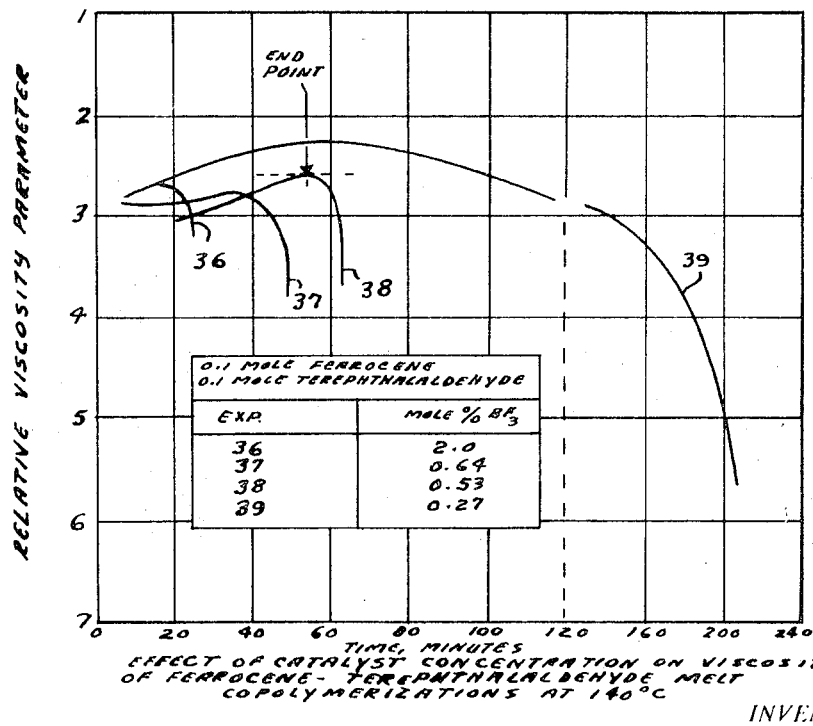
FIG. 2 shows the effect of catalyst concentration on the viscosity of ferrocene-terephthaldehyde melt copolymerizations when the copolymerizations were carried out at 140° C.

A series of reactions were carried out using the method of Example I except that the catalyst concentration was varied. The lower the catalyst concentration the slower the reaction. However, when this concentration was reduced below 0.3 mole percent, the reactions did not appear to occur at a satisfactory rate, presumably due to trace impurities which consumed part of the catalyst. Concentrations of 0.5 mole percent or more were found to yield very satisfactory results as shown in FIG. 2.

EXAMPLE IV

The copolymerization of ferrocene with 1,1′-ferrocenedicarboxaldehyde was carried out as follows. Ferrocene (1.86 g., 0.01 mole) and 1,1′-ferrocenedicarboxaldehyde (2.42 g., 0.01 mole) were dissolved in anhydrous ether (20 ml.) and boron trifluoride etherate (2 drops, redistilled, 47 percent $BF_3$) was then added. After stirring for ½ hour, the ether was evaporated and the reactant mixture was collected and pulverized. The product was then heated at 115° C. in an oil bath for 2 hours. The viscous polymer weight 3.8 g., which was about 90 percent of theory. It melted about 110–125° C. and proceeded to full cure at 220° C.

EXAMPLE V

Ferrocene (9.3 g., 0.05 mole) and 1,1′-ferrocenedicarboxaldehyde (12.1 g., 0.05 mole) were dissolved in methylene dichloride and boron trifluoride etherate (10 drops, redistilled, 47 percent $BF_3$) was then added. After stirring for 1 hour, the reactants were polymerized at 115° C. for 2 hours. After cooling, the prepolymer was pulverized. Its molecular weight by vapor phase osmometry was 362 measured in chloroform; however, this undoubtedly is low since the prepolymer contained boron trifluoride and probably even ether as boron trifluoride etherate, as well as partially hydrolyzed boron trifluoride.

EXAMPLE VI

Ferrocene (0.1 mole) and terephthalaldehyde (0.1 mole) were dissolved in methylene chloride (50 ml.) and boron trifluoride etherate (1.0 gram, 47% solution) was added. The solution was heated at reflux temperature for 24 hours with continuous stirring. After the reaction period, the solvent was removed from the reaction mixture by evaporation. The dried, solid product was then pulverized. The resulting ferrocene-terephthalaldehyde copolymer was found to soften at 40–90° C. and to cure at 175° C. Twenty grams of the prepolymer herein prepared were redissolved in 23 ml. of methylene dichloride with gentle warming. The resulting lacquer was used to coat a sample of 181–E glass fabric and the coated fabric was cut into circles. The discs were then stacked in a mold and heated under pressure. A strong reinforced structure was obtained.

EXAMPLE VII

Ferrocene (0.1 mole) and terephthalaldehyde (0.1 mole) were slurried in anhydrous ether (100 ml.) and redistilled colorless boron trifluoride etherate (1.0 gram, 47% solution) was added. The mixture was refluxed for twenty-four hours and the solvent was then removed by evaporation. The ground prepolymer weighed 32 grams, softened at 90° C., melted at 175° C. and cured completely at about 200° C. Molding of this sample, carried out in the same manner as in Example I, also resulted in a strong, reinforced structure.

EXAMPLE VIII

Ferrocene (0.4 mole) and terephthaldehyde (0.4 mole) were dissolved in 200 ml. of methylene chloride and boron trifluoride etherate (2.0 grams, 47% solution) were added. The mixture was refluxed with stirring. Samples (60 ml.) were removed after 8 hours, 22 hours, 30 hours, and 45 hours. Each sample was dried by vacuum and molded as in Example I. Each sample gave a strong, reinforced structure.

EXAMPLE IX

Methyl ferrocene and isophthalaldehye were reacted and molded in the manner described in Example I. A strong, reinforced structure with good heat and radiation resistance was obtained.

EXAMPLE X 1,1′-dimethylferrocene and 4,4′-biphenyldicarboxaldehyde were reacted and molded according to Example I. A very strong, reinforced composite was obtained.

EXAMPLE XI

Chloroferrocene and terephthalaldehyde were reacted and molded according to Example I. A strong, reinforced structure was obtained.

Pressures in the molding process varied from about 1,000 to about 4,000 p.s.i. Molding temperatures of from about 200° C. to about 325° C. were used in the foregoing examples.

The foregoing examples are for illustrative purposes only. Numerous other examples could be given using other ferrocene derivatives and aromatic dicarboxaldehydes disclosed above as reactants. Thus, while the examples describe particular embodiments of the invention, it should be understood that various modifications and adaptations thereof may be made within the spirit of the invention and within the scope of the appended claim.

I claim:
1. The ferrocene-containing copolymer of the general structure

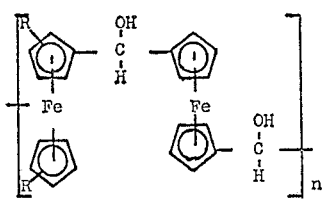

wherein R and R' are selected from the group consisting of H, $CH_3$, $C_2H_5$, $C_3H_7$, $C_4H_9$, $C_5H_{11}$, $C_6H_{13}$, $C_6H_5$, $C_6H_5CH_2$, and mixtures of the same, and wherein $n$ is an integer of from 2 to 10.

References Cited
UNITED STATES PATENTS 3,437,634  4/1969  Neuse _____ 260—67 A X
3,448,082  6/1969  McGrath et al. _____ 260—67 A WILLIAM H. SHORT, Primary Examiner
L. M. PHYNES, Assistant Examiner U.S. Cl. X.R.

117—124 E, 126 GR; 156—327; 161—170; 260—33.8 R, 37 R, 67 S